Oct. 15, 1957  A. R. CARLSON ET AL  2,809,823
CONTROL MECHANISM FOR SPEED-GOVERNING APPARATUS
Filed Feb. 26, 1954  2 Sheets-Sheet 1

INVENTOR.
ARNOLD R. CARLSON.
ARNOLD R. CARLSON, JR.
BY
Chas. T. Hawley
ATT'Y.

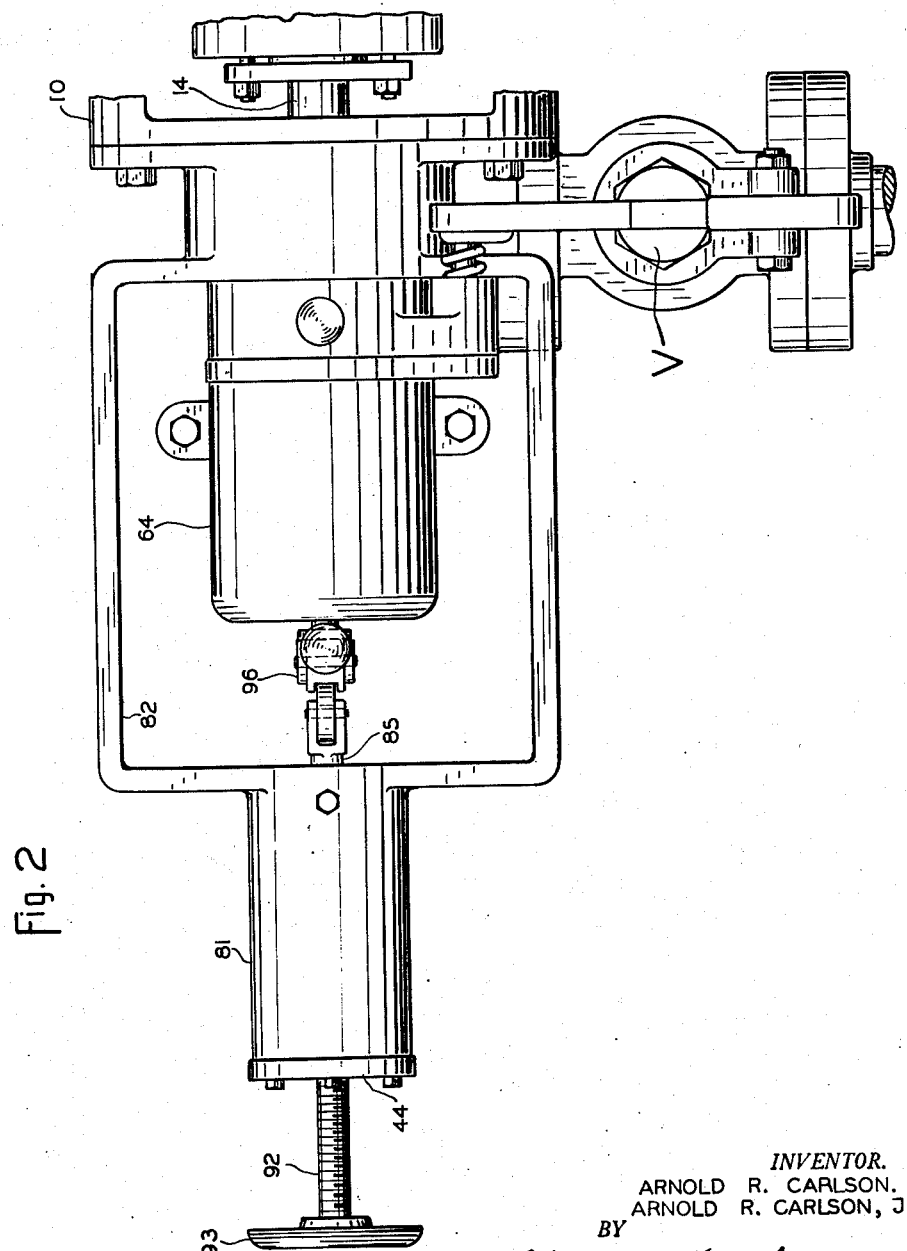

2,809,823
Patented Oct. 15, 1957

United States Patent Office

2,809,823
CONTROL MECHANISM FOR SPEED-GOVERNING APPARATUS

Arnold R. Carlson and Arnold R. Carlson, Jr., Worcester, Mass., assignors to Carling Turbine Blower Co., Worcester, Mass., a corporation of Massachusetts Application February 26, 1954, Serial No. 412,804

1 Claim. (Cl. 264—3)

This invention relates to apparatus such as a centrifugal governor which is designed to maintain constant rotational speed in a regulated unit.

It is the general object of this invention to provide improved control mechanism by which the normal regulated speed of the unit may be quickly and easily increased or diminished without changing the adjustment of the speed-governing apparatus itself and without stopping of the regulated unit.

A further object is to provide convenient means by which the regulated speed to be maintained may be increased or decreased without change or modification of the speed-governing apparatus.

Our invention further relates to arrangements and combinations of parts which will be hereinafter described and more particularly pointed out in the appended claim.

A preferred form of the invention is shown in the drawings, in which

Fig. 1 is a sectional side elevation, partly broken away and partly in section, and showing our improved control mechanism applied to a centrifugal governor which is associated with a turbine; and Fig. 2 is a plan view of the left-hand portion of Fig. 1.

Referring to the drawings, we have shown our invention as applied to a turbine having a casing 10 and a centrifugal turbine rotor 11. The discharge opening for the blower is indicated at 12. This turbine is of commercial form and the detailed construction thereof forms no part of the present invention.

The rotor 11 is mounted on a shaft 14 suitably supported in bearings 15 and 16 and provided with usual packing rings 17. The shaft 14 is threaded to receive a member 20 mounted to rotate therewith and supporting two centrifugal weight members 21 having offset arms 22 which engage a disc 23. The disc is part of a plunger 24, slidable in a bushing 25. The bushing 25 is mounted in a cylinder or shell 26 which is carried by the member 20 and which rotates with said member and with the shaft 14.

A spring 30 is mounted on a hub portion 31 of the bushing 25, and the ends of the spring 30 engage the disc 23 and the head portion of the bushing 25 respectively.

At its outer end, the plunger 24 has a head 34 which engages ball bearings 35 on the upper end of a lever 40 mounted on a fixed pivot 41. At its lower end, the lever 40 extends between discs 44 and 45 mounted in spaced relation on a valve rod 46. The rod 46 is slidable in bearings 47 and 48 and has balanced valve elements 50 and 51 mounted at its right-hand end.

As the lever 40 is swung on its pivot 41, it shifts the valve elements 50 and 51 to increase or decrease the flow of steam or other actuating fluid from the chamber or passage 60 to an outlet passage 61 connected to the supply passage 62 of the centrifugal turbine.

A casing 64 surrounds the centrifugal governor mechanism, and the parts thus far described operate in the usual manner to maintain constant rotational speed of the rotor 11. As the speed increases or decreases, the weight members 21 will swing outward or inward and correspondingly shift the member 24 and lever 40, thus moving the valve elements 50 and 51 to correct the speed by decrease or increase of the flow of steam to the rotor.

In the operation of such a turbine, it is at times desirable to change the regulated speed to be maintained and in accordance with operating conditions. Such a change commonly requires replacement of the spring 30 by a spring of different effective strength, or replacement of the weight members 21 by other members of different weight. Any of these changes requires stopping of the turbine or other associated unit, and requires more or less disassembling and reassembling of the speed-governing apparatus.

In order to accomplish the desired adjustment without such disassembling of the speed-governing apparatus, we have provided the special control mechanism shown at the extreme left in Fig. 1. This mechanism comprises an open-end cylindrical member 80, adapted to be supported in a casing 81 mounted on a fixed part 82. The member 80 may be secured in the stand 81 by a set-screw 83.

A plunger 85 is slidable in a bearing in one end of the member 80 and has a head 86 loosely slidable in the cylindrical member 80. A spring 90 is mounted between the head 86 and a disc 91, which is also slidable in the member 80. The disc 91 is engaged by an adjusting screw 92 having a hand wheel 93 and threaded in a cap 94 which is secured to the end of the stand 81. A ball bearing 96 is pivoted in the outer end of the plunger 85 and engages a surface 97 on the outer face of the lever 40.

By adjusting the screw 92, the compression of the spring 90 may be increased or decreased to provide more or less auxiliary pressure against the upper end of the lever 40. The spring 90 thus acts in conjunction with the governor spring 30 to determine the resistance of the plunger 24 to the outwardly displacing action of the centrifugal weight arms 21.

By adjusting the pressure of the spring 90 in our auxiliary control mechanism, the established rotational speed of the turbine rotor 11 or other rotated unit may be increased or decreased within substantially wide limits and without stopping the turbine or disassembling or adjusting any inaccessible parts thereof.

While shown in association with a turbine, the invention is obviously applicable to provide selective speed control for other rotated mechanisms.

Having thus described our invention and the advantages thereof, we do not wish to be limited to the details herein disclosed, otherwise than as set forth in the claim, but what we claim is:

In a speed-governing apparatus for a fluid-operated mechanism, a normally-open valve having a movable valve rod, a first spring acting on said valve rod to open said valve, a rocking lever mounted on a fixed pivot intermediate its ends with one of its ends operatively engaging said valve rod, a first plunger engaging the opposite end of said lever, centrifugal means acting on said first plunger to move said plunger against said lever and to move said lever in opposition to said first spring to close said valve, a second spring mounted on said plunger and which opposes said centrifugal means and coacts with said first spring to open said valve, a second plunger engaging said lever at the same end as the first plunger but on the opposite side of said lever from said first plunger and axially alined therewith, a third spring coacting with said first and second springs and acting through said second plunger and said lever to move said valve rod to open said valve, a normally stationary supporting member abutting the free end of said third spring, and manual means to move said supporting member and to thereby adjust the compression of said third spring, said manual means being readily accessible and operable while the machine is running and maintaining the position of said supporting member and the speed adjustment unchanged until said supporting member is shifted by said manual means to a different spring-supporting position.

References Cited in the file of this patent
UNITED STATES PATENTS

| | | |
|---|---|---|
| 205,710 | Westinghouse | July 2, 1878 |
| 291,181 | Gardner | Jan. 1, 1884 |
| 796,395 | Belches | Aug. 1, 1905 |
| 824,564 | Mohrdieck | June 26, 1906 |
| 1,012,611 | Davis | Dec. 26, 1911 |
| 1,214,287 | Douglas | Jan. 30, 1917 |
| 1,380,365 | Decrow | June 7, 1921 |
| 2,159,863 | Schilling | May 23, 1939 |